United States Patent
Harada et al.

[11] Patent Number: 5,744,203
[45] Date of Patent: Apr. 28, 1998

[54] ALIGNMENT LAYER FOR LIQUID CRYSTALS

[75] Inventors: Takamasa Harada, Inzaimachi; Fumie Nozawa, Asaka; Masami Ubukata; Haruhiko Itoh, both of Tokoraozawa, all of Japan

[73] Assignee: Hoechst Aktiengesellschaft, Frankfurt, Germany

[21] Appl. No.: 535,030

[22] PCT Filed: May 30, 1994

[86] PCT No.: PCT/EP94/01754

§ 371 Date: Oct. 18, 1995

§ 102(e) Date: Oct. 18, 1995

[87] PCT Pub. No.: WO94/28458

PCT Pub. Date: Dec. 8, 1994

[30] Foreign Application Priority Data

May 28, 1993 [JP] Japan ........................... 5-127276
May 13, 1994 [JP] Japan ........................... 6-100119

[51] Int. Cl.$^6$ ........................... G02F 1/1337
[52] U.S. Cl. ........................... 428/1; 349/123
[58] Field of Search ........................... 428/1; 575/431; 349/123

[56] References Cited

U.S. PATENT DOCUMENTS 5,008,361  4/1991  Lee ........................... 528/26

FOREIGN PATENT DOCUMENTS

| 0 231 781 | 8/1987 | European Pat. Off. . |
| 0 240 249 | 10/1987 | European Pat. Off. . |
| 0 282 254 | 9/1988 | European Pat. Off. . |
| 0 337 355 | 10/1989 | European Pat. Off. . |
| 0 414 560 | 2/1991 | European Pat. Off. . |

*Primary Examiner*—Ralph H. Dean
*Attorney, Agent, or Firm*—Frommer Lawrence & Haug LLP

[57] ABSTRACT

An alignment layer for liquid crystals is disclosed. The liquid crystal alignment layer of the present invention is excellent in adhesion to the glass substrate, has a high liquid crystal alignment angle (pretilt angle) and generates a high pretilt angle with less dependence on the type of rubbing treatment methods and processing conditions such as heating temperature. The alignment layer for liquid crystals comprises a material selected from the group consisting of: (1) at least one polymer (A) selected from the group consisting of a polyurethane, a polyester, a polyimide, a polycarbonate and a polyurea each containing a siloxane compound as a polymer constituting component; (2) a mixture (B) of a siloxane compound and at least one polymer selected from the group consisting of a polyurethane, a polyester, a polyimide, a polycarbonate and a polyurea; or (3) a mixture of the polymer (A) and the mixture (B); and (4) a mixture of the polymer (A) and at least one polymer (D) selected from the group consisting of a polyurethane, a polyester, a polyimide, a polycarbonate, a polyurea, a polyamide and a cellulose-based compound.

12 Claims, No Drawings

ALIGNMENT LAYER FOR LIQUID CRYSTALS

FIELD OF THE INVENTION

This invention relates to an alignment layer, an alignment layer, comprising a specific polymer compound, which has a high alignment ability for liquid crystals.

BACKGROUND OF THE INVENTION

A liquid crystal display device is an electrooptical device comprising a liquid crystal material whose optical characteristics vary according to an external electrical field. For example, in a TN (twisted nematic) type liquid crystal display device, a liquid crystal alignment layer is provided on the surface of a solid substrate so that a liquid crystal molecule on the surface of the substrate is in a uniform alignment state to the surface, and the surface is subjected to a rubbing treatment. That is, a liquid crystal alignment layer obtained by preparing a thin film of a heat-resistant polymer such as a polyimide and a polyamide on a solid substrate such as a glass plate by means of a spin-coating, printing or dipping method or the like, drying or curing the thin film thus prepared, and then rubbing the thin film in one direction by means of a cloth or the like. Thus, a liquid crystal molecule is aligned in one direction by the resulting liquid crystal alignment layer and, at the same time, a liquid crystal alignment tilt angle (a pretilt angle) which is generally about 2 to 4 degree to the surface of the substrate is obtained.

Further, a display device with super twisted birefringence effects (STN) which is excellent in display contents has been developed for a large-sized display (T. J. Scheffer and J. Nehring, Appl. Phys. Lett. 45 (10), 1021 (1984)). For obtaining the super twisted birefringence effects, a nematic liquid crystal blended with a chiral agent as an optically active material is used. In such a display device, a liquid crystal molecule twists from 180 to 270 degree in a liquid crystal display device as compared with a TN type device which twists at about 90 degree, and the larger the twist angle, the better the dependence upon viewing angles. A large pretilt angle of liquid crystal is required in order to produce a large twist angle. More specifically, a pretilt angle of at least 5 degree is required for obtaining a twist angle of 240 to 270 degree.

Conventionally, as a means of enlarging pretilt angle of a liquid crystal molecule, a method for forming an oblique vaporation layer of silicon oxide or the like and a method for forming a film of an organic polymer having a long chain (Japanese Patent Publication (Kokai) Nos. 177514/89 and 297819/87) and subjecting the film to a rubbing treatment have been known. However, these conventional methods have disadvantages in that the cost for mass production becomes high since oblique vaporation of silicon oxide or the like is carried out in a vacuum system and production ability of these methods is poor due to a batch process.

In the case of using a layer of the above-described long chain polyimide, the pretilt angle tends to vary depending upon the type of the rubbing treatment method and the heating temperature, and, therefore, it was technically difficult to produce stably the desired pretilt angle. Further, the layer of the long chain polyimide generally has problems in that, since it has poor adhesion to the glass substrate, the coated film of polyimide tends to be partially peeled off during the rubbing treatment thereby causing poor alignment such as generation of disclinations.

A method for improving adhesion of the coating layer to the glass substrate by using a diaminosilane represented by the general formula (I):

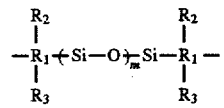

wherein $R_1$ represents a divalent hydrocarbon group, $R_2$ and $R_3$ each represents a monovalent hydrocarbon group and n is an integer of from 1 to 4, as a diamine component used in synthesizing a polyimide or a polyamide, as proposed in Japanese Patent Publications (Kokai) No. 135919/82 and No. 72924/83. However, this method does not generate a satisfactory high pretilt angle.

Furthermore, Japanese Patent Publication (Kokai) No. 62616/89 discloses that a polyamide containing a siloxane component is capable of generating stably a pretilt angle below 1.5 with less dependence on the type of the rubbing treatment method and the heating temperature. However, in STN or TFT-LCDs which require a wide viewing angle, a high pretilt angle is necessary, and, therefore, a pretilt angle below 1.5 is not practically useful.

Accordingly, the object of the present invention is to overcome the above conventional problems and to provide a a liquid crystal alignment layer which is excellent in adhesion to the glass substrate, which has a high liquid crystal alignment tilt angle (pretilt angle) and which generates a high pretilt angle with less dependence on the type of rubbing treatment methods and processing conditions such as heating temperature, as well as a liquid crystal device which has a wide viewing angle.

DETAILED DESCRIPTION OF THE INVENTION

More specifically the present invention provides an alignment layer for liquid crystals which comprises a material selected from the group consisting of:

(1) at least one polymer (A) selected from the group consisting of a polyurethane, a polyester, a polyimide, a polycarbonate and a polyurea each containing a siloxane compound as a polymer constituting component, with the proviso that a polyimide containing a siloxane component represented by the following formula:

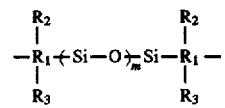

wherein $R^1$ represents a divalent hydrocarbon group, $R^2$ and $R^3$ each represents a monovalent hydrocarbon group, and m is an integer of from 1 to 4, is excluded;

(2) a mixture (B) of a siloxane compound and at least one polymer selected from the group consisting of a polyurethane, a polyester, a polyimide, a polycarbonate and a polyurea; or (3) a mixture of the polymer (A) and the mixture (B); and (4) a mixture of the polymer (A) and at least one polymer (D) selected from the group consisting of a polyurethane, a polyester, a polyimide, a polycarbonate, a polyurea, a polyamide and a cellulose-based compound.

A further aspect of the present invention is a liquid crystal display device, which comprises a liquid crystal layer sandwiched between a pair of substrates bearing—on their opposing surfaces—transparent electrodes and being coated on at least one of said surfaces with an alignment layer as described above.

The material for the alignment layer according to the present invention preferably forms a microphase separation structure.

Also, the material for the alignment layer according to the present invention preferably has two or more glass transition points (Tg).

Further, in the present invention, the above-described polymer (A) is preferably a block copolymer.

In the present invention, it is considered that improved adhesion of the alignment layer to the glass substrate can be obtained by introducing a siloxane component into the alignment layer. Also, in the alignment layer according to the present invention, a pretilt angle is produced due to incorporation of a siloxane compound into a component of at least one polymer selected from a polyurethane, a polyester, a polyimide, a polycarbonate and a polyurea (hereinafter referred to as polymer (C)) or mixing of the siloxane compound with the polymer (C) or both. It is considered that a microphase separation structure comprising the polymer (C) and the siloxane component is formed on the surface of the alignment layer, and the resulting surface structure affects the alignment of the liquid crystal molecule which contacts with the surface of the alignment layer.

According to the present invention, a constant pretilt angle can be obtained independently of the conditions such as heating temperature and rubbing strength. Further, according to the present invention, a wide viewing angle can be obtained.

Furthermore, in the present invention, it was found that a wide viewing angle can be obtained by using as an alignment layer material a mixture of the polymer (A) and at least one polymer (D) selected from the group consisting of a polyurethane, a polyester, a polyimide, a polycarbonate, a polyurea, a polyamide and a cellulose-based compound.

In addition, in the present invention, it was found that a larger pretilt angle and a wide viewing angle can be obtained when the alignment layer material forms a microphase separation structure.

In addition, in the present invention, it was found that a higher pretilt angle can be obtained stably when the alignment layer material has two or more glass transition points.

The polyurethane used in the present invention can be synthesized by, for example, a polyaddition reaction between a diisocyanate and a diol. Examples of diisocyanates include ethylene diisocyanate, propylene diisocyanate, tetraethylene diisocyanate, hexamethylene diisocyanate, m-phenylene diisocyanate, p-phenylene diisocyanate, 2,4-tolylene diisocyanate, 2,6-tolylene diisocyanate, 1,5-naphthylene diisocyanate, 4,4'-diphenylmethane diisocyanate, 3,3'-dimethyl-4,4'-diphenylene diisocyanate, m-xylylene diisocyanate, and p-xylylene diisocyanate. Examples of diols include ethylene glycol, propylene glycol, trimethylene glycol, tetramethylene glycol, pentamethylene glycol, hexamethylene glycol, decamethylene glycol, diethylene glycol, triethylene glycol, cyclohexanedimethanol, p-xylylene glycol, hydroquinone, resorcinol, 4,4'-dihydroxydiphenyldipenyl, 2,2'-dihydroxydiphenyl, 4,4'-dihydroxydiphenylsulfone, 2,6-dihydroxynaphthalene, 4,4'-dihydroxydiphenylmethane, 4,4'-dihydroxydiphenyl ether, 3,4'-dihydroxydiphenyl ether, 2,2-(4,4'-dihydroxydiphenyl) propane, 2,2'-bis(4-hydroxycyclohexyl)propane, 2,2'-bis(4-hydroxy-3,5-dimethylphenyl)propane, 1,4-bis(2-hydroxyethoxy)benzene, bis[4-(2-hydroxyethoxy)phenyl] sulfone, 1,3-bis[N-(2-hydroxyethyl)-4-pyridyl]propane, 1,3-bis(4-hydroxyphenoxy)benzene, 1,4-bis(3-hydroxyphenoxy)benzene, 2,2-bis(4-hydroxyphenyl) butane, α,α'-bis(4-hydroxyphenyl)-1,4-diisopropylbenzene, 4,4'-dihydroxydiphenyl sulfide, 1,5-dihydroxynaphthalene, 4,4-dihydroxydiphenylethane, methylhydroquinone, methylresorcinol, 3,4'-dihydroxybenzanilide, 3,3'-dichloro-4,4-dihydroxydiphenyl, 3,3'-dihydroxydiphenylamine, 3,3'-dihydroxydiphenylsulfone, 3,4'-dihydroxydiphenylmethane, 3,4'-dihydroxydiphenylsulfone, 2,2-(3,4'-dihydroxydiphenyl) propane, 3,4'-dihydroxydiphenyl sulfide, 3,4'-dihydroxybenzanilide, 1,1-(3,4'-dihydroxydiphenyl) cyclohexane, 3,4'-dihydroxydiphenyldifluoromethane, and 2,2-(3,4'-dihydroxydiphenyl)hexafluoropropane. Two or more types of the diisocyanate and diol components may be used in combination.

The polyesters used in the present invention can be synthesized by various methods, for example, a method for reacting a diol with a dicarboxylic acid or a dicarboxylic acid dichloride, or an ester interchange reaction. In case of the synthesis of the polyester by a condensation reaction between a diol and a dicarboxylic acid, examples of the dicarboxylic acid include isophthalic acid, phthalic acid, terephthalic acid, diphenylacetic acid, diphenyl ether-p,p'-dicarboxylic acid, diphenylsulfone-p,p'-dicarboxylic acid, diphenylmethane-p,p'-dicarboxylic acid, diphenylmethane-m,m'-dicarboxylic acid, diphenylethane-p,p'-dicarboxylic acid, benzophenone-4,4'-dicarboxylic acid, diphenylbutane-p,p'-dicarboxylic acid, naphthalene 1,4-dicarboxylic acid, naphthalene-1,5-dicarboxylic acid, naphthalene-2,6-dicarboxylic acid, m-phenyleneglycolic acid, and p-phenylenediglycolic acid. Also, the dicarboxylic acid dichlorides include dichlorides of the above-described carboxylic acids. Examples of the diol which can be used include those used for the synthesis of the polyurethane described above. Two or more types of the diols, dicarboxylic acids and dicarboxylic acid dichlorides can be used in combination.

The polyimide used in the present invention can be generally synthesized by reacting a diamine with a tetracarboxylic acid dianhydride or a tetracarboxylic acid dithioanhydride, or reacting a silylated compound of a diamine with a tetracarboxylic acid dianhydride. Examples of the diamine include aliphatic or alicyclic diamines such as 1,1-metaxylylenedimaine, 1,3-propanediamine, tetramethylenediamine, pentamethylenediamine, hexamethylenediamine, octamethylenediamine, nonamethylenediamine, 4,4-diaminoheptamethylenediamine, 1,4-diaminocyclohexene, isophoronediamine, tetrahydrodicyclopentadienylenediamine, hexahydro-4,7-methanoindanylenedimethylenediamine, and tricyclo[6,2,1,0,2,7]-undecylenedimethyldiamine.

Examples of the aromatic diamine include m-phenylenediamine, p-phenylenediamine, 4,4'-diaminodiphenylmethane, 4,4'-diaminodiphenyl ether, 4,4'-diaminodiphenylsulfone, 2,2-(4,4'-diaminodiphenyl) propane, 4,4'-diaminodiphenyl sulfide, 1,5-diaminonaphthalene, 4,4-diaminodiphenylethane, m-toluenediamine, p-toluenediamine, 3,4'-diaminobenzanilide, 1,4-diaminonaphthalene, 3,3'-dichloro-4,4'-diaminodiphenyl, benzidine, 4,4'-diaminodiphenylamine, 4,4'-diaminodiphenyl-N-methylamine, 4,4'-diaminodiphenyl-N-phenylamine, 3,3'-diaminodiphenylsulfone, 4,4'-diaminodiphenyldiethylsilane, 4,4'-diaminodiphenylsilane, 3,4'-diaminodiphenylmethane, 1,1-diaminodiphenylethane, 3,4'-diaminodiphenyl ether, 3,4'-diaminodiphenylsulfone, 2,2-(3,4'-diaminodiphenyl)propane, 3,4'-diaminodiphenyl sulfide, 3,4'-diaminobenzanilide, 3,4'-diaminobenzophenone, 1,1-(3,4'-diaminodiphenyl)cyclohexane, 1,1-(3,4'-diaminodiphenyl)cyclopentane, 3,4'-diaminodiphenyldifluoromethane, 2,2-(3,4'-diaminodiphenyl)hexafluoropropane, 2,5,2',5'-tetramethyl-3,4'-diaminodiphenylmethane, 2,5,2',5'-tetramethyl-3,4'-diaminodiphenyl ether, 2,5,2',5'-tetramethyl-3,4'-diaminodiphenyl sulfone, 2,5,2',5'-tetramethyl-3,4'-diaminodiphenyl sulfide, 2,5,2',5'-tetramethyl-3,4'-diaminobenzanilide, 2,5,2',5'-tetramethyl-3,4'-diaminobenzophenone, 2,2'-dichloro-3,4'-diaminodiphenylmethane, 2,2'-dichloro-3,4'-diaminodiphenyl ether, 2,2'-dibromo-3,4'-diaminodiphenylsulfone, 2,2'-difluoro-3,4'-diaminobenzophenone, 2,2'-bis[4-(4-aminophenoxy)phenyl]propane, 2,2-bis[3-methyl-4-(4-aminophenoxy)phenyl]propane, 2,2-bis[3-bromo-4-(4-aminophenoxy)phenyl]propane, 2,2-bis[3-ethyl-4-(4-aminophenoxy)phenyl]propane, 2,2-bis[3-propyl-4-(4-aminophenoxy)phenyl]propane, 2,2-bis[3-isopropyl-4- (4-aminophenoxy)phenyl]propane, 2,2-bis[3-butyl-4-(4-aminophenoxy)phenyl]propane, 2,2-bis[3-sec-butyl-4-(4-aminophenoxy)phenyl]propane, 2,2-bis[3-methoxy-4-(4-aminophenoxy)phenyl]propane, 2,2-bis[3-ethoxy-4-(4-aminophenoxy)phenyl]propane, 2,2-bis[3,5-dimethyl-4-(4-aminophenoxy)phenyl]propane, 2,2-bis[3,5-dichloro-4-(4-aminophenoxy)phenyl]propane, 2,2-bis[3,5-dibromo-4-(4-aminophenoxy)phenyl]propane, 2,2-bis[3,5-dimethoxy-4-(4-aminophenoxy)phenyl]propane, 2,2-bis[3-chloro-4-(4-aminophenoxy)-5-methylphenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3-bromo-4-(4-aminophenoxy)phenyl]ethane, 1,1-bis[3-ethyl-4-(4-aminophenoxy)phenyl]ethane, 1,1-bis[3-propyl-4-(4-aminophenoxy)phenyl]ethane, 1,1-bis[3-isopropyl-4-(4-aminophenoxy)phenyl]ethane, 1,1-bis[3-butyl-4-(4-aminophenoxy)phenyl]ethane, 1,1-bis[3-sec-butyl-4-(4-aminophenoxy)phenyl]ethane, 1,1-bis[3-methoxy-4-(4-aminophenoxy)phenyl]ethane, 1,1-bis[3-ethoxy-4-(4-aminophenoxy)phenyl]ethane, 1,1-bis[3,5-dimethyl-4-(4-aminophenoxy)phenyl]ethane, 1,1-bis[3,5-dichloro-4-(4-aminophenoxy)phenyl]ethane, 1,1-bis[3,5-dibromo-4-(4-aminophenoxy)phenyl]ethane, 1,1-bis[3,5-dimethoxy-4-(4-aminophenoxy)phenyl]ethane, 1,1-bis[3-chloro-4-(4-aminophenoxy)-5-methylphenyl]ethane, bis[4-(4-aminophenoxy)phenyl]methane, bis[3-methyl-4-(4-aminophenoxy)phenyl]methane, bis[3-chloro-4-(4-aminophenoxy)phenyl]methane, bis[4-(3-bromo-4-aminophenoxy)phenyl]methane, bis[3-ethyl-4-(4-aminophenoxy)phenyl]methane, bis[3-propyl-4-(4-aminophenoxy)phenyl]methane, bis[isopropyl-4-(4-aminophenoxy)phenyl]methane, bis[3-butyl-4-(4-aminophenoxy)phenyl]methane, bis[3-sec-butyl-4-(4-aminophenoxy)phenyl]methane, bis[3-methoxy-4-(4-aminophenoxy)phenyl]methane, bis[3-ethoxy-4-(4-aminophenoxy)phenyl]methane, bis[3,5-dimethyl-4-(4-aminophenoxy)phenyl]methane, bis[3,5-dichloro-4-(4-aminophenoxy)phenyl]methane, bis[3,5-dibromo-4-(4-aminophenoxy)phenyl]methane, bis[3,5-dimethoxy-4-(4-aminophenoxy)phenyl]methane, bis[3-chloromethoxy-4-(4-aminophenoxy)-5-methylphenyl]-methane, 1,1,1,3,3,3-hexafluoro-2,2-bis[4-(4-aminophenoxy)-phenyl]-propane, 1,1,1,3,3,3-hexachloro-2,2-bis[4-(4-aminophenoxy)-phenyl]propane, 3,3-bis[4-(4-aminophenoxy)phenyl]propane, 1,1-bis[4-(4-aminophenoxy)phenyl]pentane, 1,1,1,3,3,3-hexafluoro-2,2-bis[3,5-dimethyl-4-(4-aminoplenoxy)phenyl]propane, 3,3-bis[3,5-dimethyl-4-(4-aminophenoxy)phenyl]propane, 1,1-bis[3,5-dimethyl-4-(4-aminophenoxy)phenyl]pentane, 1,1-bis[3,5-dimethyl-4-(4-aminophenoxy)phenyl]propane, 1,1,1,3,3,3-hexafluoro-2,2-bis[3,5-dibromo-4-(4-aminophenoxy)phenyl]propane, 1,1,1,3,3,3-hexachloro-2,2-bis[3,5-dibromo-4-(4-aminophenoxy)phenyl]propane, 3,3-bis[3,5-dibromo-4-(4-aminophenoxy)phenyl]pentane, 1,1-bis[3,5-dibromo-4-(4-aminophenoxy)phenyl]propane, 2,2-bis[4-(4-aminophenoxy)phenyl]butane, 2,2-bis[3-methyl-4-(4-aminophenoxy)phenyl]butane, 2,2-bis[3,5-dimethyl-4-(4-aminophenoxy)phenyl]butane, 2,2-bis[3,5-dibromo-4-(4-aminophenoxy)phenyl]butane, 1,1,1,3,3,3-hexafluoro-2,2-bis[3-methyl-4-(4-aminophenoxy)-phenyl]propane, 1,1-bis[4-(4-aminophenyl)phenyl]cyclohexane, 1,1-bis[4-(4-aminophenoxy)phenyl]cyclopentane, bis[4-(4-aminophenoxy)phenyl]sulfone, bis [4-(4-aminophenoxy)phenyl]ether, bis[4-(3-aminophenoxy)phenyl]sulfone, 4,4-carbonyl-bis(p-phenyleneoxy)dianiline, and 4,4'-bis(4-aminophenoxy)biphenyl. The silylated compound of diamine can be obtained by silylating the diamine described above.

Examples of the tetracarboxylic acid dianhydride which can be used in the present invention include aliphatic and alicyclic tetracarboxylic acid dianhydrides such as 3,3',4,4'-biphenyltetracarboxylic acid dianhydride, 2,2',3,3'-biphenyltetracarboxylic acid dianhydride, 2,3,3',4'-biphenyltetracarboxylic acid dianhydride, 2,3,3',4'-benzophenonetetracarboxylic acid dianhydride, 2,2',3,3'-benzophenonetetracarboxylic acid dianhydride, 1,2,5,6-naphthalenetetracarboxylic acid dianhydride, 2,3,6,7-naphthalenetetracarboxylic acid dianhydride, thiophene-2,3,4,5-tetracarboxylic acid dianhydride, 2,2-bis(3,4-biscarboxyphenyl)propane dianhydride, 3,4-dicarboxyphenylsulfone dianhydride, perylene-3,4,9,10-tetracarboxylic acid dianhydride, bis(3,4-dicarboxyphenyl) ether dianhydride, cyclohexanetetracarboxylic acid dianhydride, butanetetracarboxylic acid dianhydride, 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 3,5,6-tricarboxy-norbornane-2-acetic acid dianhydride, 5-(2,5-dioxotetrahydrofuryl)-3-methyl-cyclohexene dicarboxylic acid dianhydride, bicyclo[2.2.2]-oct-7-ene-tetracarboxylic acid dianhydride and the like, and aromatic tetracarboxylic acid dianhydrides such as pyromellitic acid dianhydride, 3,3',4,4'-benzophenonetetracarboxylic acid dianhydride, 3,3',4,4'-biphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-diphenylethertetracarboxylic acid dianhydride, 3,3',4,4'-dimethylphenylsilanetetracarboxylic acid dianhydride, 3,3',4,4'-tetraphenylsilanetetracarboxylic acid dianhydride, 1,2,3,4-furanetetracarboxylic acid dianhydride, 4,4'-bis(3,4-dicarboxyphenoxy)diphenyl sulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidinetetracarboxylic acid dianhydride, 3,3',4,4'-diphenyl ether tetracarboxylic acid dianhydride, bis(phthalic acid)phenylsulfine oxide dianhydride, p-phenyl-bis-(triphenylphthalic acid) dianhydride, m-phenylene-bis-(triphenylphthalic acid) dianhydride, bis-(triphenylphthalic acid)-4,4'-diphenyl ether dianhydride, and bis-(triphenylphthalic acid)-4,4'-diphenylmethane dianhydride and the like.

The tetracarboxylic acid dithioanhydride can be obtained by, for example, reacting the above-described tetracarboxylic acid anhydride with sodium sulfide pentahydrate.

Two or more of the diamines, silylated compounds of diamines, tetracarboxylic acid dianhydrides and tetracarboxylic acid dithioanhydrides may be used in combination.

The polycarbonate used in the present invention can be synthesized by, for example, reacting a diol with phosgene, or an ester exchange reaction between a diol and a carbonic acid ester or a bischlorocarbonic acid ester of a monofunctional aryl or alkylhydroxy compound. Examples of the diol include 4,4'-dihydroxydiphenylmethane, 4,4'-dihydroxydiphenyl-1,1-ethane, 4,4'-dihydroxydiphenyl-1,1-butane, 4,4'-dihydroxydiphenyl-1,1-isobutane, 4,4'-dihydroxydiphenyl-1,1-cyclohenane, 4,4'-dihydroxydiphenyl-2,2-propane, 4,4'-dihydroxydiphenyl-2,2-butane, 4,4'-dihydroxydiphenyl-2,2-hexane, 4,4'-dihydroxydiphenyl ether, 4,4'-dihydroxydiphenyl sulfide, 4,4'-dihydroxydiphenyl sulfoxide, and 4,4'-dihydroxysulfone. The carbonic acid ester and bischlorocarbonic acid ester of the monofunctional aryl or alkylhydroxy compound are not limited to specific compounds. Two or more types of diols may be used in combination.

The polyurea used in the present invention can be synthesized by, for example, a reaction between a diamine and a diisocyanate. The diamine which can be used includes the same diamine as used for the synthesis of the polyimide described above. Also, the diisocyanate which can be used includes the same diisocyanate as used for the synthesis of the polyurethane described above. Two or more types of diamines and diisocyanates may be used in combination.

The polyamide used in the present invention can be synthesized by, for example, a polycondensation reaction of a diamine with a dicarboxylic acid or a dicarboxylic acid dichloride. The diamine which can be used includes the same diamine as used for the synthesis of the polyimide described above. Also, the dicarboxylic acid which can be used includes the same dicarboxylic acid as used for the synthesis of the polyester described above. Two or more types of diamines and diisocyanates may be used in combination.

Examples of the cellulose used in the present invention include cellulose ether, cellulose hydroxypeptide, cellulose acetate phthalate, cellulose triacetate, cellulose acetate butylate, hydroxypropyl cellulose, cellulose, cellulose acetate hydrogenephthalate, cellulose propionate, cellulose phosphate, hydroxyethyl cellulose, diethylaminoethyl cellulose, p-aminobenzyl cellulose, polyethyleneimine cellulose, triethylaminoethyl cellulose, methyl cellulose and ethyl cellulose.

The siloxane compound used in the present invention can be modified siloxane compounds having a reactive group at the terminal thereof represented by the following general formula (II):

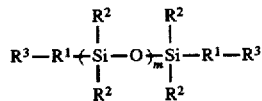

wherein m is an integer of 1 or more, $R^1$ represents a divalent hydrocarbon group, $R^2$ represents a monovalent straight or branched chain aliphatic hydrocarbon group having from 1 to 5 carbon atoms, an alicyclic hydrocarbon group or an aromatic hydrocarbon group, and $R^3$ represents —$NH_2$, —OH, —COOH or —$NHSi(CH_3)_3$.

Examples of the hydrocarbon group for $R^1$ in the formula (II) include a straight chain alkenyl group or a branched chain alkenyl group such as —$CH_2$—, —$(CH_2)_2$— and —$(CH_2)_3$—.

Examples of the aliphatic hydrocarbon group for $R^2$ in the formula (II) include a methyl group, an ethyl group, a propyl group, an isopropyl group, an n-butyl group, an isobutyl group, a t-butyl group and a pentyl group. Examples of the alicyclic hydrocarbon group for $R^2$ includes a cyclopropyl group, a cyclobutyl group, a cyclopentyl group and a cyclohexyl group. Examples of the aromatic hydrocarbon group for $R^2$ include a phenyl group, a tolyl group, a xylyl group, a biphenyl group, a naphthyl group, an anthryl group and a phenanthryl group, as well as these aromatic hydrocarbon groups substituted with, for example, a halogen atom, a nitro group and/or an alkyl group, on the aromatic ring thereof. $R^2$'s may be the same or different. Preferably, $R^2$ is a methyl group.

m represents an integer of 1 or more, and, preferably m is 5 or more. When the polymerization degree of polysiloxane is too high, the strength of alignment layer material becomes too low and, thus, m is preferably 100 or less.

In the alignment layer material (1) according to the present invention, the siloxane content in the polymer (A) which contains a siloxane compound as a constituting component can be varied by charging a changing amount of the siloxane compound in the synthesis of the polymer. Further, the pretilt angle of the resulting alignment layer can be varied by changing the siloxane content in the polymer composition. The siloxane content in the polymer composition is from about 0.1% to about 80% by weight and, preferably, from 1% to 50% by weight. Also, the intrinsic viscosity (ηlnh) of the alignment layer material of the present invention is generally from 0.05 dl/g to 10 dl/g (at 30° C., in a 0.5 g/dl dimethylacetamide solution) and, preferably from 0.05 dl/g to 5 dl/g.

In the alignment layer material (2) according to the present invention, the content of the siloxane compound in the mixture (B) is from about 0.1 to about 80% by weight and, preferably, from 1 to 50% by weight.

In the alignment layer material (3) according to the present invention, i.e., a mixture of the polymer (A) and the mixture (B), the content of the siloxane component is from about 0.1 to about 80% by weight and, preferably, from 1 to 50% by weight based on the total weight of the mixture.

In the alignment layer material (4) according to the present invention, the content of the siloxane component is from about 0.1 to about 80% by weight and, preferably, from 1 to 50% by weight based on the total weight of the mixture.

The liquid crystal display device using the liquid crystal layer according to the present invention can be prepared by, for example, the following process.

That is, the process comprises first providing a transparent electroconductive layer in a pattern form on a substrate, and then coating a solution containing the liquid crystal alignment layer material according to the present invention in an organic solvent on the transparent electroconductive layer side of the substrate by the roll-coater method, the spinner method, the printing method or the like. The coated material is then heated generally at a temperature of from 80° to 350° C. to form a coated film. The film thickness of the coated film is generally from 5 nm to about 1,000 nm.

The organic solvent used for the above solution is not limited to specific solvent as long as it dissolves the liquid crystal layer material according to the present invention. Examples of the organic solvent include nonprotonic polar solvents such as N-methyl-2-pyrrolidone, N,N-dimethylacetamide, N,N-dimethylformamide, dimethyl sulfoxide, γ-butyrolactone, tetramethylurea and hexamethylphosphortriamide, and phenol type solvents such as m-cresol, xylenol, phenol and halogenated phenol.

If necessary, other usual organic solvents may be mixed with the above solvent in such an amount that it does not precipitate the alignment layer material. Examples of such organic solvents include alcohols, ketones, esters, ethers, halogenated hydrocarbons and hydrocarbons such as methyl alcohol, ethyl alcohol, isopropyl alcohol, cyclohexanol, ethylene glycol, propylene glycol, 1,4-butanediol, triethylene glycol, ethylene glycol monomethyl ether, acetone, methyl ethyl ketone, methyl isobutyl ketone, cyclohexanone, methyl acetate, ethyl acetate, butyl acetate, diethyl oxalate, diethylmaloniate, diethyl ether, ethylene glycol methyl ether, ethylene glycol ethyl ether, ethylene glycol-n-propyl ether, ethylene glycol-1-propyl ether, ethylene glycol-n-butyl ether, ethylene glycol dimethyl ether, ethylene glycol ethyl ether acetate, diethylene glycol dimethyl ether, ethylene glycol ethyl ether acetate, diethylene glycol dimethyl ether, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene, diethylene glycol monomethyl ether, diethylene glycol monoethyl ether, diethylene glycol monobutyl ether, 1-methoxy-2-propanol and 1-ethoxy-2-propanol.

The coated film formed on the substrate is subjected to a liquid crystal alignment treatment, preferably by rubbing. E.g., the layer is rubbed with a roll having wound thereonto a cloth made by synthetic fibers such as nylon to obtain a liquid crystal alignment layer.

Examples of the substrate which can be used include a transparent substrate made by a glass such as float glass and soda glass, and plastic films such as polyethylene terephthalate, polybutylene terephthalate, polyethersulfone and polycarbonate.

Two substrates having formed thereon the liquid crystal alignment layer obtained above are faced each other in such a manner that the rubbing direction of the alignment layer is counter parallel or at a right angle to each other, and the peripheral portion between the substrates is sealed with a sealing agent. Then, liquid crystal is charged into the space between the substrates, and a charging inlet is closed to obtain a liquid crystal cell. Then polarizers are adhered to both surfaces of the liquid crystal cell in such a manner that the polarization direction of each of the polarizers is equal or at right angle to the rubbing direction of the liquid crystal alignment layer of the substrate to obtain a liquid crystal display device.

The alignment layer material used in the present invention can be synthesized according to a conventional method as described in, for example, Japanese Patent Publication (Kokai) No. 123815/89, Polym.-Plast. Technol. Eng., 28(2) ,109 (1989) and Asahi Glass Foundation Research Report, 59 (1991).

The present invention is further illustrated in more detail by the following Examples and Comparative Examples, but these examples are not to be construed as limiting the present invention. Also, some examples for synthesis of alignment layer materials used in the present invention are shown in the following Synthesis Examples, but the present invention is not limited thereto.

SYNTHESIS EXAMPLE 1

α,ω-Bis(3-aminopropyl)polydimethylsiloxane (produced by Shinetsu Chemical Co. Ltd., Mn=1652, hereinafter referred to as PDMS-diamine 1) was used as a siloxane compound. PDMS-diamine 1 was reacted with chlorotrimethylsilane in toluene while heating under refluxing in the presence of triethylamine to effect trimethylsilylation at the terminal of the diamine (hereinafter referred to as a silylated PDMS-1). In the same manner, an amino group of 4,4'-diaminophenyl ether was silylated. 1.80 g of silylated PDMS-1 and 10.32 g of silylated 4,4'-diaminophenyl ether were dissolved in 150 ml of diethylene glycol dimethyl ether in a flask while stirring under a nitrogen atmosphere. Then, 6.67 g of pyromellitic anhydride was added thereto, and the mixture was polymerized at 30° C. for 3.5 hours. The reaction solution was poured into an excess amount of methanol to precipitate the reaction product, and the product was washed with methanol and dried under reduced pressure at 40° C. for 20 hours to obtain a polysiloxane-polyamide acid trimethylsilyl ester type block copolymer (hereinafter referred to as Polymer 1).

SYNTHESIS EXAMPLE 2

α,ω-Bis(3-aminopropyl)polydimethylsiloxane (produced by Shinetsu Chemical Co. Ltd., Mn=824, hereinafter referred to as PDMS-diamine 2) was used as a siloxane compound.

Further, 4,4'-diaminodiphenylmethane and 3,3',4,4'-biphenyltetracarboxylic acid anhydride were used as polyimide components. In the same manner as described in Synthesis Example 1, 4.92 g of silylated PDMS-diamine 2, 13.68 g of silylated 4,4'-diaminodiphenylmethane and 13.23 g of 3,3',4,4'-biphenyltetracarboxylic acid anhydride were reacted to obtain a polysiloxane-polyamide acid trimethylsilyl ester type block copolymer (hereinafter referred to as Polymer 2).

SYNTHESIS EXAMPLE 3

PDMS-Diamine 1 was used as a siloxane compound. First, benzophenonetetracarboxylic acid dianhydride was reacted with sodium sulfide pentahydrate to obtain benzophenonetetracarboxylic acid dithioanhydride. Then, 3.30 g of PDMS-diamine 1, 7.2 g of 3,4'-diaminodiphenyl ether and 13.45 g of benzophenonetetracarboxylic acid dithioanhydride were dissolved in 220 ml of pyridine in a flask under a nitrogen atmosphere, and polymerized at 100° C. for 6.5 hours. The reaction solution was poured into an excess amount of methanol to precipitate the reaction product, and the product was washed with methanol and dried under reduced pressure at 40° C. for 20 hours to obtain a polysiloxane-polyimide type block copolymer(hereinafter referred to as Polymer 3).

SYNTHESIS EXAMPLE 4

1.65 g of PDMS-diamine 1, 10.34 g of α,α'-bis(4-aminophenyl)-1,4'-diisopropylbenzene and 10.97 g of benzophenonetetracarboxylic acid dithioanhydride were reacted in the same manner as described in Synthesis Example 3 to obtain a polysiloxane-polyimide type block copolymer (hereinafter referred to as Polymer 4).

SYNTHESIS EXAMPLE 5

α,ω-Bis(3-aminopropyl)polydimethylsiloxane (produced by Shinetsu Chemical Co. Ltd., Mn=2900, hereinafter referred to as PDMS-diamine 3) was used as a siloxane compound. 7.91 g of isophthalic acid, 0.254 g of lithium chloride and 40 ml of 1,3-dimethyl-2-imidazolidone (DMI) were placed in a flask, and heated while stirring at 200° C. under a nitrogen atmosphere. Then, to the resulting mixture was added dropwise a solution of 12.51 g of 4,4'-diphenylmethanediisocyanate in 140 ml of DMI while stirring, and, after ten and several minutes, the reaction solution was rapidly cooled to room temperature. Further, a solution of 6.48 g of PDMS-diamine 3 in 40 ml of 1,2-bis (2-methoxyethoxy)ethane was added dropwise thereto, and the resulting mixture was reacted while stirring at room temperature for 3 hours. The reaction solution was poured into an excess amount of methanol to precipitate the reaction product, and the product was washed with methanol and dried under reduced pressure at 40° C. for 20 hours to obtain a polysiloxane-polyurea type block copolymer (hereinafter referred to as Polymer 5).

SYNTHESIS EXAMPLE 6

α,ω-Bis(3-aminopropyl)polydimethylsiloxane (produced by Shinetsu Chemical Co. Ltd., Mn=3900, hereinafter referred to as PDMS-diamine 4) was used as a siloxane compound. 11.88 g of 4,4'-diaminodiphenylmethane, 3.90 g of PDMS-diamine 4 and 100 ml of anisole were placed in a flask, and to the resulting solution was added 10.61 g of 2,4-tolylenediisocyanate. The mixture was then reacted under a nitrogen atmosphere at 80° C. for 7 hours. The reaction solution was poured into an excess amount of methanol to precipitate a reaction product, and the product was washed with methanol, and dried under reduced pressure at 40° C. for 20 hours to obtain a polysiloxane-polyurea type block copolymer (hereinafter referred to as Polymer 6).

SYNTHESIS EXAMPLE 7

α,ω-Bis(3-hydroxypropyl)polydimethylsiloxane (produced by Toshiba Silicone Co. Ltd., Mn=1700, hereinafter referred to as Dihydroxy-PDMS 1) was used as a polysiloxane compound. 2.07 g of Dihydroxy-PDMS 1, 8.70 g of 2,4-tolylenediisocyanate and 100 ml of a mixed solvent of tetrahydrofuran/dimethyl acetate (3:1 by volume) were placed in a flask, and 1 wt % tin octanoate and triethylamine were added thereto. The resulting mixture was then reacted at 50° C. for 1 hour. 11.14 g of 2,2-bis(4-hydroxyphenyl) propane was added to the reaction mixture, followed by reacting for further 7 hours. After concentrating the reaction mixture under reduced pressure, the concentrate was poured into an excess amount of methanol to precipitate a reaction product. The product was washed with methanol and dried at 40° C. for 20 hours to obtain a polysiloxane-polyurethane type block copolymer (hereinafter referred to as Polymer 7).

SYNTHESIS EXAMPLE 8

α,ω-Bis(3-hydroxypropyl)polydimethylsiloxane (produced by Toshiba Silicone Co. Ltd., Mn=2700, hereinafter referred to as Dihydroxy-PDMS 2) was used as a siloxane compound. In the same manner as described in Synthesis Example 7 but using 2.97 g of Dihydroxy-PDMS 2, 25.03 g of 4,4'-diphenylmethanediisocyanate and 19.80 g of 3,4'-dihydroxydiphenyl ether, a polysiloxane-polyurethane type block copolymer (hereinafter referred to as Polymer 8) was obtained.

SYNTHESIS EXAMPLE 9

α,ω-Bis(3-hydroxypropyl)polydimethylsiloxane (produced by Toshiba Silicone Co. Ltd., Mn=2200, hereinafter referred to as Dihydroxy-PDMS 3) was used as a polysiloxane compound. 5.28 g of Dihydroxy-PDMS 3, 11.91 g of 4,4'-dihydroxydiphenylsulfone and 350 ml of a mixed solvent of tetrachloroethane (TCE) and pyridine were placed in a flask and dissolved with stirring. To the resulting solution was added dropwise a solution of 10.15 g of terephthalic acid dichloride in 150 ml of TCE, followed by reacting under a nitrogen atmosphere at room temperature for 9 hours. Acetone was added to the reaction solution to precipitate a reaction product, and the product was washed with acetone and then pure water and dried under reduced pressure at 40° C. for 20 hours to obtain a polysiloxane-polyester type block copolymer (hereinafter referred to as Polymer 9).

SYNTHESIS EXAMPLE 10

α,ω-Bis(3-hydroxypropyl)polydimethylsiloxane (produced by Toshiba Silicone Co. Ltd., Mn=1800, hereinafter referred to as Dihydroxy-PDMS 4) was used as a siloxane compound. In the same manner as described in Synthesis Example 9 but using 2.20 g of Dihydroxy-PDMS 4, 9.76 g of 4,4'-dihydroxydiphenyl ether and 10.15 g of isophthalic acid dichloride, a polysiloxane-polyester type block copolymer (hereinafter referred to Polymer 10) was obtained.

SYNTHESIS EXAMPLE 11

2.0 g of Dihydroxy-PDMS 4, 5.33 g of hydroquinone and 350 ml of a mixed solvent of TCE and pyridine were placed in a flask and dissolved with stirring. To the resulting solution was added dropwise a solution of 17.66 g of 2,2-bis(p-chloroformyloxyphenyl)propane in 150 ml of TCE, and triethylamine was added thereto as a catalyst, followed by reacting the mixture under a nitrogen atmosphere at room temperature for 8 hours. Acetone was added to the reaction solution to precipitate a reaction product, and the product was washed with acetone and then pure water and dried under reduced pressure at 40° C. for 20 hours to obtain a polysiloxane-polycarbonate type block copolymer (hereinafter referred to as Polymer 11).

SYNTHESIS EXAMPLE 12

In the same manner as described in Synthesis Example 9 but using 1.13 g of 1,3-bis(hydroxypropyl) tetramethyldisiloxane, 9.11 g of 4,4'-dihydroxydiphenylmethane and 10.15 g of terephthalic acid dichloride, a copolymer (hereinafter referred to as Polymer 12) was obtained.

SYNTHESIS EXAMPLE 13

In the same manner as described in Synthesis Example 6 but using 3.11 g of 1,3-bis(aminopropyl) tetramethyldisiloxane, 8.48 g of 2,2-(4,4'-diaminodiphenyl) propane and 8.70 g of 2,4-tolylenediisocyanate, a copolymer (hereinafter referred to as Polymer 13) was obtained.

Example 1

Polymer 1 obtained in Synthesis Example 1 was dissolved in dimethylacetamide in an amount of 4% by weight to prepare a solution having a viscosity of 11 cp (at 25° C.). The resulting solution was coated on a glass substrate having a transparent electrode using a spinner and heated at 300° C. for 1 hour to obtain a coated film of polysiloxane-polyimide type block copolymer. The thickness of the resulting coated film was about 50 nm. The thickness of the coated film can be varied by altering a concentration of the polymer solution or a degree of rotation of the spinner. The adhesion of the resulting coated film to the glass substrate was tested by the cross-cut method by measuring a number of peeled coated films of 100 cross-cut coated films. Further, the coated films were rubbed in one direction with a nylon cloth, and then a pair of the coated substrates was faced each other in such a manner that the rubbing direction was opposite to each other with a spacer of 20 μm thickness being inserted between the substrates. The nematic liquid crystal (ZLI 1565,produced by Merck co.) was poured into the space between the substrates to prepare a liquid crystal cell. Then, the pretilt angle of the resulting liquid crystal cell was measured.

Also, a pair of the coated substrates was faced each other in such a manner that the rubbing directions of the upper and the lower substrates were shifted at an angle of 90 degree with a spacer having a thickness of 5 μm being inserted therebetween, and a nematic liquid crystal (LGT5047LC produced by Chisso Co.) was poured into the space between the substrates. Then the viewing angle of the resulting liquid crystal cell was measured. As a result, the cell did not show reversal at viewing positions of 40 degree inclined in upper, lower, left and right directions from the front surface of the cell, and an image having a high contrast was obtained.

Example 2

Polymer 2 obtained in Synthesis Example 2 was dissolved in dimethylacetamide at a concentration of 6% by weight to prepare a solution. The resulting solution had a viscosity of 8 cp (at 25° C.). The solution was coated in the same manner as described in Example 1 to prepare a liquid crystal cell, and the cell was evaluated in the same manner as in Example 1.

Example 3

Polymer 3 obtained in synthesis Example 3 was dissolved in N-methyl-2-pyrrolidone at a concentration of 4% by weight to prepare a solution. The resulting solution had a viscosity of 10 cp (at 25° C.). The solution was coated on a glass plate having a transparent electrode using a spinner and then dried at 180° C. for 1 hour. The resulting coated film was processed in the same manner as described in Example 2 to prepare a liquid crystal cell, and the cell was evaluated in the same manner as in Example 1.

Example 4

Polymer 4 obtained in Synthesis Example 4 was dissolved in γ-butyrolactone at a concentration of 3% by weight to prepare a solution. The resulting solution had a viscosity of 13 cp (at 25° C.). The solution was coated in the same manner as described in Example 3 to prepare a liquid crystal cell, and the cell was evaluated in the same manner as in Example 1.

Example 5

Polymer 5 obtained in Synthesis Example 5 was dissolved in N-methyl-2-pyrrolidone at a concentration of 5% by weight to prepare a solution. The resulting solution had a viscosity of 8 cp (at 25° C.). The solution was coated in the same manner as described in Example 3 to prepare a liquid crystal cell, and the cell was evaluated in the same manner as in Example 1.

Example 6

Polymer 6 obtained in Synthesis Example 6 was dissolved in a mixed solvent of N-methyl-2-pyrrolidone and γ-butyrolactone at a concentration of 3% by weight to prepare a solution. The resulting solution had a viscosity of 9 cp (at 25° C.). The solution was coated in the same manner as described in Example 3 to prepare a liquid crystal cell, and the cell was evaluated in the same manner as in Example 1.

Also the viewing angle was measured in the same manner as described in Example 1. As a result, the cell did not show reversal at viewing positions of 40 degree inclined in upper, lower, left and right directions from the front surface of the cell, and an image having a high contrast was obtained.

Example 7

Polymer 7 obtained in Synthesis Example 7 was dissolved in γ-butyolactone at a concentration of 4% by weight to prepare a solution. The resulting solution had a viscosity of 11 cp (at 25° C.). The solution was coated in the same manner as described in Example 3 to prepare a liquid crystal cell, and the cell was evaluated in the same manner as in Example 1.

Also the viewing angle was measured in the same manner as described in Example 1. As a result, the cell did not show reversal at viewing positions of 40 degree inclined in upper, lower, left and right directions from the front surface of the cell, and an image having a high contrast was obtained.

Example 8

Polymer 8 obtained in Synthesis Example 8 was dissolved in N-methyl-2-pyrrolidone at a concentration of 3% by weight to prepare a solution. The resulting solution had a viscosity of 14 cp (at 25° C.). The solution was coated in the same manner as described in Example 3 to prepare a liquid crystal cell, and the cell was evaluated in the same manner as in Example 1.

Example 9

Polymer 9 obtained in Synthesis Example 9 was dissolved in N-methyl-2-pyrrolidone at a concentration of 4% by weight to prepare a solution. The resulting solution had a viscosity of 10 cp (at 25° C.). The resulting solution was coated in the same manner as described in Example 3 to prepare a liquid crystal cell, and the cell was evaluated in the same manner as in Example 1.

Also the viewing angle was measured in the same manner as described in Example 1. As a result, the cell did not show reversal at viewing positions of 40 degree inclined in upper, lower, left and right directions from the front surface of the cell, and an image having a high contrast was obtained.

Example 10

Polymer 10 obtained in synthesis Example 10 was dissolved in a mixed solvent of N-methyl-2-pyrrolidone and γ-butyrolactone at a concentration of 4% by weight to prepare a solution. The resulting solution had a viscosity of 11 cp (at 25° C.). The solution was coated in the same manner as described in Example 3 to prepare a liquid crystal cell, and the cell was evaluated in the same manner as in Example 1.

Example 11

Polymer 11 obtained in Synthesis Example 11 was dissolved in N-methyl-2-pyrrolidone at a concentration of 4% by weight to prepare a solution. The resulting solution had a viscosity of 12 cp (at 25° C.). The solution was coated in the same manner as described in Example 3 to prepare a liquid crystal cell, and the cell was evaluated in the same manner as in Example 1.

Also the viewing angle was measured in the same manner as described in Example 1. As a result, the cell did not show reversal at viewing positions of 40 degree inclined in upper, lower, left and right directions from the front surface of the cell, and an image having a high contrast was obtained.

Example 12

A liquid crystal cell was prepared in the same manner as described in Example 3 but changing the heating temperature to 250° C., and the resulting cell was evaluated for the pretilt angle of the liquid crystal. As a result, no substantial changes were observed in the liquid crystal alignment and the pretilt angle even when the heating temperature was changed, and the liquid crystal cell was found to have good reproducibility.

Example 13

A liquid crystal cell was prepared in the same manner as described in Example 4 but changing the clearance between the nylon cloth and the substrate to be used for rubbing the coated film, and the resulting liquid crystal cell was evaluated for the pretilt angle of liquid crystal in the same manner as in Example 1. The clearance between the nylon cloth and the substrate used was 0.1 mm, 0.2 mm or 0.4 mm. As a result, no substantial changes were observed in the liquid crystal alignment and the pretilt angle even when the clearance between the nylon cloth and the substrate was changed.

Example 14

The pretilt angle of the liquid crystal prepared in Example 1 was evaluated in the same manner as described in Example 13 by changing the clearance between the nylon cloth and the substrate to be used for rubbing the coated film. As a result, no substantial changes were observed in the liquid crystal alignment and the pretilt angle even when the clearance between the nylon cloth and the substrate was changed.

Example 15

The pretilt angle of the liquid crystal prepared in Example 10 was evaluated by changing the clearance between the nylon cloth and the substrate to be used for rubbing the coated film in the same manner as described in Example 13. As a result, no substantial changes were observed in the liquid crystal alignment and the pretilt angle even when the clearance between the nylon cloth and the substrate was changed.

Example 16

The pretilt angle of the liquid crystal prepared in Example 10 was evaluated by changing the heating temperature of the coated film in the same manner as described in Example 12. As a result, no substantial changes were observed in the liquid crystal alignment and the pretilt angle even when the heating temperature was changed.

Example 17

The pretilt angle of the liquid crystal prepared in Example 7 was evaluated by changing the clearance between the nylon cloth and the substrate to be used for rubbing the coated film in the same manner as described in Example 13. As a result, no substantial changes were observed in the liquid crystal alignment and the pretilt angle even when the clearance between the nylon cloth and the substrate was changed.

Example 18

The pretilt angle of the liquid crystal prepared in Example 6 was evaluated by changing the heating temperature of the coated film in the same manner as described in Example 12. As a result, no substantial changes were observed in the liquid crystal alignment and the pretilt angle even when the heating temperature was changed.

Example 19

The pretilt angle of the liquid crystal prepared in Example 11 was evaluated by changing the clearance between the nylon cloth and the substrate to be used for rubbing the coated film in the same manner as described in Example 13. As a result, no substantial changes were observed in the liquid crystal alignment and the pretilt angle even when the clearance between the nylon cloth and the substrate was changed.

Example 20

Polymer 12 obtained in Example 12 was dissolved in N-methyl-2-pyrrolidone at a concentration of 3% by weight to prepare a solution. In the same manner as described in Example 3, the solution was coated to prepare a liquid crystal cell, and the resulting cell was evaluated.

Also the viewing angle was measured in the same manner as described in Example 1. As a result, the cell did not show reversal at viewing positions of 40 degree inclined in upper, lower, left and right directions from the front surface of the cell, and an image having a high contrast was obtained.

Example 21

Polymer 13 obtained in Example 13 was dissolved in dimethylacetamide at a concentration of 3% by weight to prepare a solution. In the same manner as described in Example 3, the solution was coated to prepare a liquid crystal cell and, the resulting cell was evaluated.

Example 22

2,2-bis(4-hydroxyphenyl)propane and 2,4-tolylenediisocyanate were reacted in a usual manner to synthesize a polyurethane (hereinafter referred to as Polyurethane 1). Polyurethane 1 and dimethylpolysiloxane (9:1 by weight) were dissolved in dimethylacetamide at a concentration of 3% by weight to prepare a solution. The resulting solution was coated in the same manner as described in Example 3 to prepare a liquid crystal cell, and the cell was evaluated in the same manner as in Example 1.

Also the viewing angle was measured in the same manner as described in Example 1. As a result, the cell did not show reversal at viewing positions of 40 degree inclined in upper, lower, left and right directions from the front surface of the cell, and an image having a high contrast was obtained.

Example 23

4,4'-dihydroxydiphenylsulfone and terephthalic acid dichloride were reacted in a usual manner to synthesize a polyester (hereinafter referred to as Polyester 1). Polyester 1 and dimethylpolysiloxane (97:3 by weight) were dissolved in N-methyl-2-pyrrolidone at a concentration of 4% by weight to prepare a solution. The resulting solution was coated in the same manner as described in Example 3 to prepare a liquid crystal cell, and the cell was evaluated in the same manner as in Example 1.

Example 24

A mixture of Polymer 3 obtained in Synthesis Example 3 and the polymer mixture obtained in Example 23 (7:3 by weight) was dissolved in N-methyl-2-pyrrolidone at a concentration of 4% by weight to prepare a solution. The resulting solution was coated in the same manner as described in Example 3 to prepare a liquid crystal cell, and the cell was evaluated in the same manner as in Example 1.

Also the viewing angle was measured in the same manner as described in Example 1. As a result, the cell did not show reversal at viewing positions of 40 degree inclined in upper, lower, left and right directions from the front surface of the cell, and an image having a high contrast was obtained.

Example 25

A mixture of Polymer 5 obtained in Synthesis Example 5 and the polymer mixture obtained in Example 22 (4:1 by weight) was dissolved in N-methyl-2-pyrrolidone at a concentration of 4% by weight to prepare a solution. The resulting solution was coated in the same manner as described in Example 3 to prepare a liquid crystal cell, and the cell was evaluated in the same manner as in Example 1.

Example 26

A mixture of Polymer 1 obtained in Synthesis Example 1 and a copolymer resin (polyimide) obtained from 2,2-bis(4-aminophenyl)hexafluoropropane and 4,4'-(hexafluoroisopropylidene)diphenyl anhydride (4:1 by weight) was dissolved in N-methyl-2-pyrrolidone at a concentration of 3% by weight to prepare a solution. The resulting solution was coated in the same manner as described in Example 3 to prepare a liquid crystal cell, and the cell was evaluated in the same manner as in Example 1.

Also the viewing angle was measured in the same manner as described in Example 1. As a result, the cell did not show reversal at viewing positions of 45 degree inclined in upper, lower, left and right directions from the front surface of the cell, and an image having a high contrast was obtained.

Example 27

A mixture of Polymer 2 obtained in Synthesis Example 2 and a polyamide POLIX-003 (produced by Hoechst A. G.) (7:3 by weight) was dissolved in N-methyl-2-pyrrolidone at a concentration of 3% by weight to prepare a solution. The resulting solution was coated in the same manner as described in Example 3 to prepare a liquid crystal cell, and the cell was evaluated in the same manner as in Example 1.

Also the viewing angle was measured in the same manner as described in Example 1. As a result, the cell did not show reversal at viewing positions of 45 degree inclined in upper, lower, left and right directions from the front surface of the cell, and an image having a high contrast was obtained.

Example 28

A mixture of Polymer 9 obtained in Synthesis Example 9 and a polyamide SIXEF70/30 (produced by Hoechst Celanese) (7:3 by weight) was dissolved in N-methyl-2-pyrrolidone at a concentration of 3% by weight to prepare a solution. The resulting solution was coated in the same manner as described in Example 3 to prepare a liquid crystal cell, and the cell was evaluated in the same manner as in Example 1.

Also the viewing angle was measured in the same manner as described in Example 1. As a result, the cell did not show reversal at viewing positions of 45 degree inclined in upper, lower, left and right directions from the front surface of the cell, and an image having a high contrast was obtained.

Comparative Example 1

3,4'-Diaminodiphenyl ether and benzophenone tetracarboxylic acid dianhydride were reacted in a usual manner to synthesize a polyamide acid. A solution of the resulting polyamide acid was then coated on a substrate having a transparent electrode in the same manner as described in Example 1 and annealed at 300° C. for 1 hour to obtain a polyimide film containing no polysiloxane component in Synthesis Example 3. The resulting polyimide film was then evaluated in the same manner as described in Example 1.

Comparative Example 2

Polydimethylsiloxane (produced by Toshiba Silicone Co., Ltd.) was dissolved in dimethylacetamide to prepare a solution. In the same manner as described in Example 3, this solution was coated to prepare a liquid crystal cell, and the resulting cell was evaluated. As a result, it was found that the liquid crystal alignment was in a perpendicular alignment, and the desired pretilt angle was not obtained.

The results of the evaluation as described in Examples 1 to 23 and Comparative Examples 1 and 2 are shown in Tables 1 to 3 below.

TABLE 1

| | | PDMS content in polymer (%) | Test on adhesion properties | Pretilt angle degree |
|---|---|---|---|---|
| Example | 1 | 12 | 0/100 | 8 |
| | 2 | 20 | 0/100 | 11 |
| | 3 | 15 | 0/100 | 9 |
| | 4 | 7 | 0/100 | 6 |
| | 5 | 30 | 0/100 | 14 |
| | 6 | 18 | 0/100 | 11 |
| | 7 | 9 | 0/100 | 7 |
| | 8 | 7 | 0/100 | 6 |
| | 9 | 20 | 0/100 | 12 |
| | 10 | 11 | 0/100 | 7 |
| | 11 | 13 | 0/100 | 8 |
| | 20 | 6 | 0/100 | 4 |
| | 21 | 19 | 0/100 | 10 |
| | 22 | 10 | 0/100 | 7 |
| | 23 | 3 | 0/100 | 3 |
| | 24 | 14 | 0/100 | 7 |
| | 25 | 24 | 0/100 | 12 |
| | 26 | 10 | 0/100 | 6 |
| | 27 | 14 | 0/100 | 5 |
| | 28 | 14 | 0/100 | 6 |
| Comparative Example 1 | | — | 33/100 | 0 |
| Comparative Example 2 | | — | 0/100 | — |

TABLE 2

| | Heating Temperature (°C.) | Pretilt Angle (degree) |
|---|---|---|
| Example 12 | 180 | 9.5 |
| | 250 | 9.1 |
| Example 16 | 180 | 6.9 |
| | 250 | 7.2 |
| Example 18 | 180 | 8.4 |
| | 250 | 8.2 |

TABLE 3

| | Clearance between Substrate and Cloth (mm) | Pretilt Angle (degree) |
|---|---|---|
| Example 13 | 0.1 | 6.3 |
| | 0.2 | 6.2 |
| | 0.4 | 6.5 |

TABLE 3-continued

| | Clearance between Substrate and Cloth (mm) | Pretilt Angle (degree) |
|---|---|---|
| Example 14 | 0.1 | 7.9 |
| | 0.2 | 8.1 |
| | 0.4 | 8.3 |
| Example 15 | 0.1 | 7.3 |
| | 0.2 | 6.9 |
| | 0.4 | 6.9 |
| Example 17 | 0.1 | 6.8 |
| | 0.2 | 6.9 |
| | 0.4 | 7.0 |
| Example 19 | 0.1 | 8.5 |
| | 0.2 | 8.3 |
| | 0.4 | 8.2 |

What is claimed is:

1. An alignment layer for liquid crystals comprising a material from the group consisting of:
   (1) at least one polymer (A) selected from the group consisting of a polyurethane, a polyester, a polycarbonate and a polyurea each containing a siloxane compound as a polymer constituting component;
   (2) a mixture (B) of a siloxane compound and at least one polymer selected from the group consisting of a polyurethane, a polyester, a polyimide, a polycarbonate and a polyurea; or
   (3) a mixture of the polymer (A) and the mixture (B); and
   (4) a mixture of the polymer (A) and at least one polymer (D) selected from the group consisting of a polyurethane, a polyester, a polyimide, a polycarbonate, a polyurea, a polyamide and a cellulose-based compound.

2. The alignment layer for liquid crystals as claimed in claim 1, wherein said material forms a microphase separation structure.

3. The alignment layer for liquid crystals as claimed in claim 1, wherein said material has two or more glass transition temperatures.

4. The alignment layer for liquid crystals as claimed in claim 1, wherein said polymer (A) is a block copolymer.

5. A liquid crystal display device, which comprises a liquid crystal layer sandwiched between a pair of substrates bearing—on their opposing surfaces—transparent electrodes and being coated on at least one of said surfaces with an alignment layer for liquid crystals as claimed in claim 1.

6. The alignment layer for liquid crystals as claimed in claim 2, wherein said material has two or more glass transition temperatures.

7. The alignment layer for liquid crystals as claimed in claim 2, wherein said polymer (A) is a block copolymer.

8. The alignment layer for liquid crystals as claimed in claim 3, wherein said polymer (A) is a block copolymer.

9. A liquid crystal display device, which comprises a liquid crystal layer sandwiched between a pair of substrates bearing—on their opposing surfaces—transparent electrodes and being coated on at least one of said surfaces with an alignment layer for liquid crystals as claimed in claim 2.

10. A liquid crystal display device, which comprises a liquid crystal layer sandwiched between a pair of substrates bearing—on their opposing surfaces—transparent electrodes and being coated on at least one of said surfaces with an alignment layer for liquid crystals as claimed in claim 3.

11. A liquid crystal display device, which comprises a liquid crystal layer sandwiched between a pair of substrates bearing—on their opposing surfaces—transparent electrodes and being coated on at least one of said surfaces with an alignment layer for liquid crystals as claimed in claim 4.

12. A process for producing an alignment layer for liquid crystals comprising providing a transparent electroconductive layer in a pattern form on a substrate, coating the transparent electro-conductive layer side of the substrate with a solution of a material selected from the group consisting of:
   (1) at least one polymer (A) selected from the group consisting of a polyurethane, a polyester, a polycarbonate and a polyurea each containing a siloxane compound as a polymer constituting component;
   (2) a mixture (B) of a siloxane compound and at least one polymer selected from the group consisting of a polyurethane, a polyester, a polyimide, a polycarbonate and a polyurea; or
   (3) a mixture of the polymer (A) and the mixture (B); and
   (4) a mixture of the polymer (A) and at least one polymer (D) selected from the group consisting of a polyurethane, a polyester, a polyimide, a polycarbonate, a polyurea, a polyamide and a cellulose-based compound, in an organic solvent, heating the material at a temperature of from 80° C. to 350° C. to form a coated film, and subjecting the coated films to a rubbing treatment.

* * * * *